(12) United States Patent
Landis et al.

(10) Patent No.: US 11,558,221 B2
(45) Date of Patent: Jan. 17, 2023

(54) SOUNDING REFERENCE SIGNAL RESOURCE INDICATOR GROUP INDICATION

(71) Applicant: QUALCOMM Incorporated, San Diego, CA (US)

(72) Inventors: Shay Landis, Hod Hasharon (IL); Idan Michael Horn, Hod Hasharon (IL); Amit Bar-Or Tillinger, Tel-Aviv (IL)

(73) Assignee: QUALCOMM INCORPORATED, San Diego, CA (US)

( * ) Notice: Subject to any disclaimer, the term of this patent is extended or adjusted under 35 U.S.C. 154(b) by 45 days.

(21) Appl. No.: 17/184,317

(22) Filed: Feb. 24, 2021

(65) Prior Publication Data

US 2022/0271977 A1 Aug. 25, 2022

(51) Int. Cl.
| | |
|---|---|
| *H04L 25/02* | (2006.01) |
| *H04B 17/336* | (2015.01) |
| *H04L 5/00* | (2006.01) |
| *H04W 24/10* | (2009.01) |
| *H04W 72/04* | (2009.01) |
| *H04W 76/27* | (2018.01) |
| *H04W 80/02* | (2009.01) |

(52) U.S. Cl.
CPC ....... *H04L 25/0226* (2013.01); *H04B 17/336* (2015.01); *H04L 5/0048* (2013.01); *H04W 24/10* (2013.01); *H04W 72/042* (2013.01); *H04W 72/046* (2013.01); *H04W 76/27* (2018.02); *H04W 80/02* (2013.01)

(58) Field of Classification Search
CPC . H04L 25/0226; H04L 5/0048; H04B 17/336; H04W 24/10; H04W 72/042; H04W 72/046; H04W 76/27; H04W 80/02
See application file for complete search history.

(56) References Cited

U.S. PATENT DOCUMENTS

| | | | | |
|---|---|---|---|---|
| 2018/0206132 A1* | 7/2018 | Guo | ..................... | H04B 7/0404 |
| 2019/0103949 A1* | 4/2019 | Harrison | ............... | H04B 7/0691 |
| 2020/0314860 A1* | 10/2020 | Zhou | ................... | H04W 72/042 |

FOREIGN PATENT DOCUMENTS

| | | | | |
|---|---|---|---|---|
| EP | 3386229 A1 * | 10/2018 | ............ | H04W 16/14 |
| WO | WO-2020209281 A1 * | 10/2020 | | |

* cited by examiner

*Primary Examiner* — Shailendra Kumar
(74) *Attorney, Agent, or Firm* — Harrity & Harrity, LLP

(57) ABSTRACT

Various aspects of the present disclosure generally relate to wireless communication. In some aspects, a mobile station may receive a sounding reference signal resource indicator (SRI) group indicator, the SRI group indicator indicating multiple SRIs for one or more uplink communications. The mobile station may transmit the one or more uplink communications via multiple beams associated with the multiple SRIs. Numerous other aspects are described.

30 Claims, 9 Drawing Sheets

SOUNDING REFERENCE SIGNAL RESOURCE INDICATOR GROUP INDICATION

FIELD OF THE DISCLOSURE

Aspects of the present disclosure generally relate to wireless communication and to techniques and apparatuses for sounding reference signal resource indicator group indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes receiving, by the mobile station, a sounding reference signal (SRS) resource indicator (SRI) group indicator, the SRI group indicator indicating multiple SRIs for one or more uplink communications; and transmitting, by the mobile station, the one or more uplink communications via multiple beams associated with the multiple SRIs.

In some aspects, a method of wireless communication performed by a base station includes transmitting, by the base station, an SRI group indicator, the SRI group indicator indicating multiple SRIs for one or more uplink communications; and receiving, by the base station, the one or more uplink communications via multiple beams associated with the multiple SRIs.

In some aspects, a mobile station for wireless communication includes a memory and one or more processors operatively coupled to the memory, the memory and the one or more processors configured to: receive an SRI group indicator, the SRI group indicator indicating multiple SRIs for one or more uplink communications; and transmit the one or more uplink communications via multiple beams associated with the multiple SRIs.

In some aspects, a base station for wireless communication includes a memory and one or more processors operatively coupled to the memory, the memory and the one or more processors configured to: transmit an SRI group indicator, the SRI group indicator indicating multiple SRIs for one or more uplink communications; and receive the one or more uplink communications via multiple beams associated with the multiple SRIs.

In some aspects, a non-transitory computer-readable medium storing a set of instructions for wireless communication includes one or more instructions that, when executed by one or more processors of a mobile station, cause the mobile station to: receive an SRI group indicator, the SRI group indicator indicating multiple SRIs for one or more uplink communications; and transmit the one or more uplink communications via multiple beams associated with the multiple SRIs.

In some aspects, a non-transitory computer-readable medium storing a set of instructions for wireless communication includes one or more instructions that, when executed by one or more processors of a base station, cause the base station to: transmit an SRI group indicator, the SRI group indicator indicating multiple SRIs for one or more uplink communications; and receive the one or more uplink communications via multiple beams associated with the multiple SRIs.

In some aspects, an apparatus for wireless communication includes means for receiving an SRI group indicator, the SRI group indicator indicating multiple SRIs for one or more uplink communications; and means for transmitting the one or more uplink communications via multiple beams associated with the multiple SRIs.

In some aspects, an apparatus for wireless communication includes means for transmitting an SRI group indicator, the SRI group indicator indicating multiple SRIs for one or more uplink communications; and means for receiving the one or more uplink communications via multiple beams associated with the multiple SRIs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
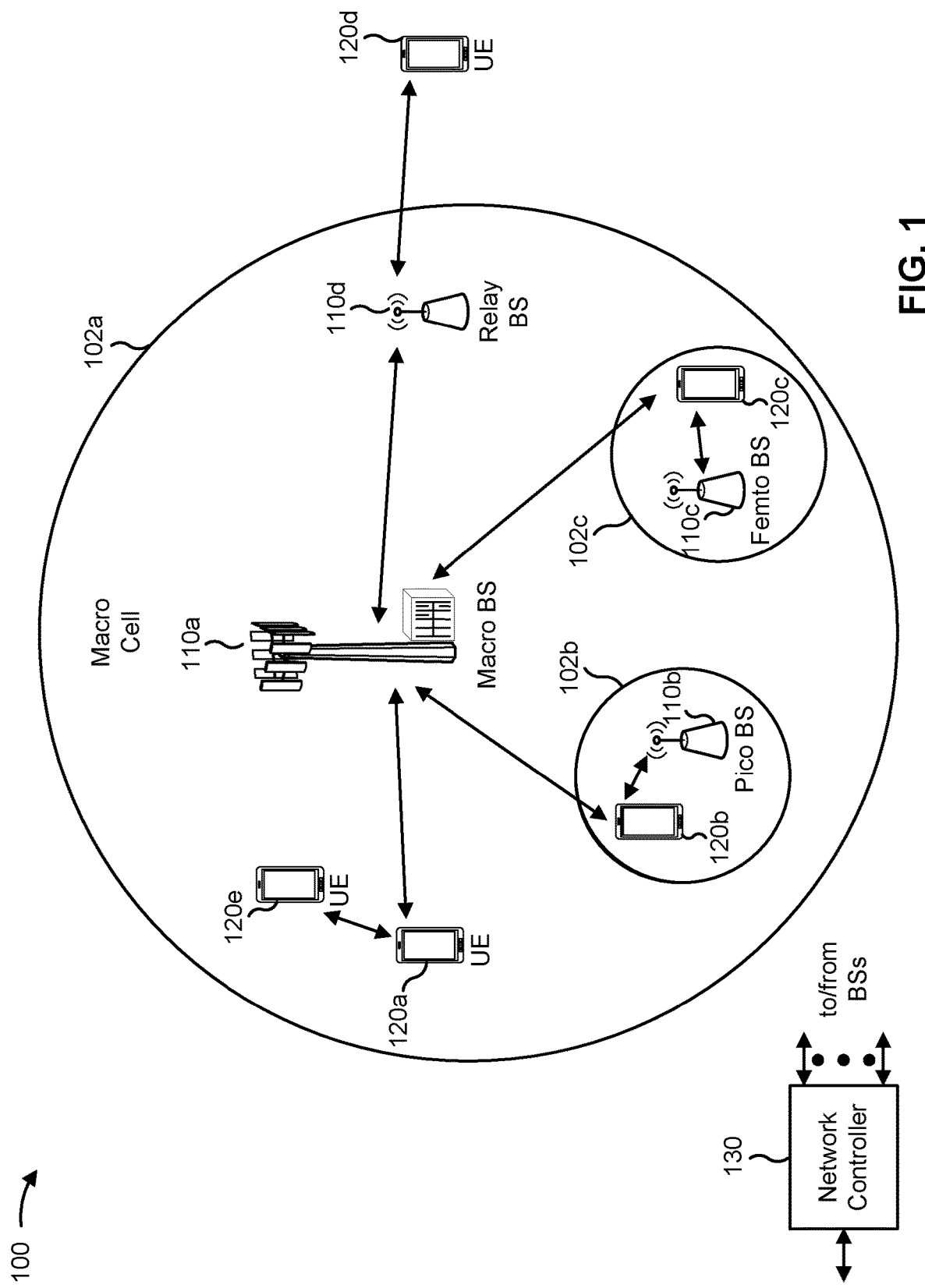
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
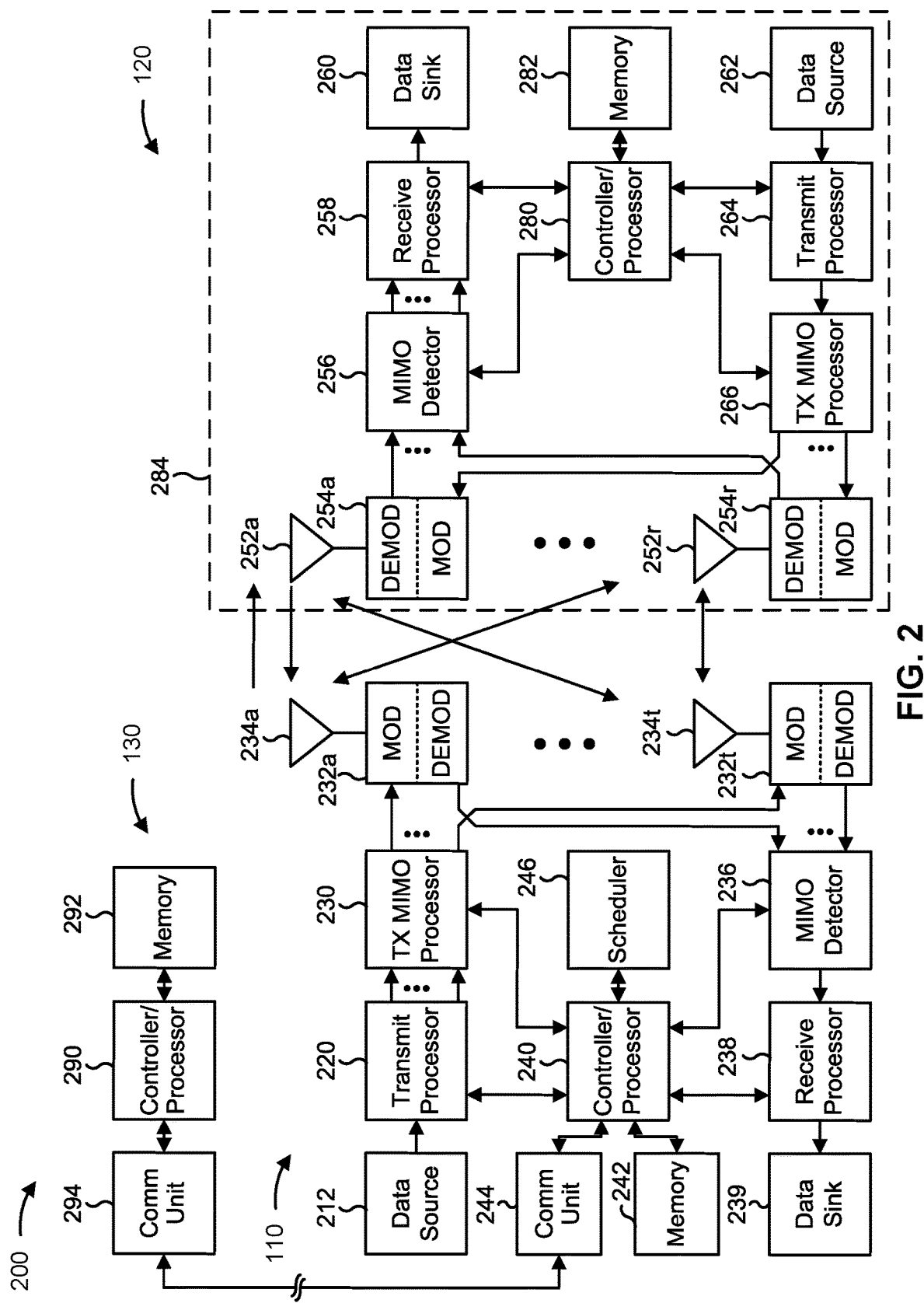
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120 (e.g., a mobile station), and/or any other component(s) of FIG. 2 may perform one or more techniques associated with SRI group indication, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a mobile station (e.g., UE 120) includes means for receiving, by the mobile station, an SRI group indicator, the SRI group indicator indicating multiple SRIs for one or more uplink communications; and/or means for transmitting, by the mobile station, the one or more uplink communications via multiple beams associated with the multiple SRIs. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for receiving an indication of configurations of a set of SRI groups, wherein each SRI group, of the set of SRI groups, indicates multiple SRIs for uplink communications.

In some aspects, the mobile station includes means for receiving the indication of the configurations of the set of SRI groups via one or more of radio resource control (RRC) signaling or medium access control (MAC) signaling.

In some aspects, the mobile station includes means for receiving the SRI group indicator based at least in part on one or more of: satisfaction of an interference threshold among the multiple SRIs; an SRI group indicated by the SRI group indicator having a largest number of SRIs, of SRI groups of the set of SRI groups, that satisfy an interference threshold; the multiple SRIs having a lowest interference among SRIs of the SRI groups; or the multiple SRIs having a lowest interference among SRIs of SRI groups that satisfy an SRI number threshold.

In some aspects, the mobile station includes means for transmitting multiple SRSs via multiple beams, wherein the multiple SRIs are comprised in an SRI group indicated by the SRI group indicator based at least in part on measurements of the multiple SRSs.

In some aspects, the mobile station includes means for receiving the SRI group indicator via downlink control information.

In some aspects, the base station includes means for transmitting, by the base station, an SRI group indicator, the SRI group indicator indicating multiple SRIs for one or more uplink communications; and/or means for receiving, by the base station, the one or more uplink communications via multiple beams associated with the multiple SRIs. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting an indication of configurations of a set of SRI groups, wherein each SRI group, of the set of SRI groups, indicates multiple SRIs for uplink communications.

In some aspects, the base station includes means for transmitting the indication of the configurations of the set of SRI groups via one or more of RRC signaling or MAC signaling.

In some aspects, the base station includes means for transmitting the SRI group indicator based at least in part on one or more of: satisfaction of an interference threshold among the multiple SRIs; an SRI group indicated by the SRI group indicator having a largest number of SRIs, of SRI groups of the set of SRI groups, that satisfy an interference threshold; the multiple SRIs having a lowest interference among SRIs of the SRI groups; or the multiple SRIs having a lowest interference among SRIs of SRI groups that satisfy an SRI number threshold.

In some aspects, the base station includes means for measuring multiple SRSs transmitted via multiple beams, wherein the multiple SRIs are comprised in an SRI group indicated by the SRI group indicator based at least in part on measurements of the multiple SRSs.

In some aspects, the base station includes means for transmitting the SRI group indicator via downlink control information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
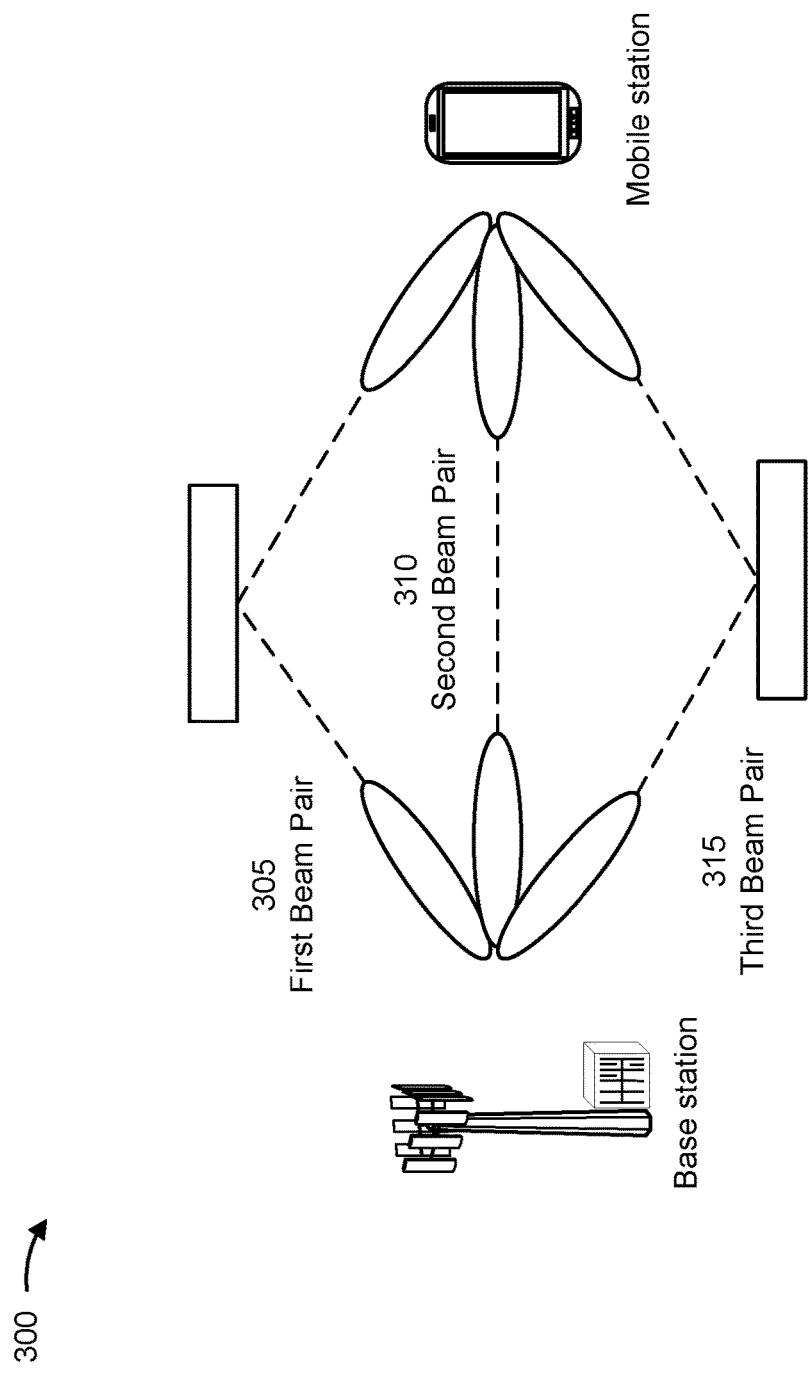
FIGS. 3 and 4 are diagrams illustrating examples associated with spatial division multiplexing, in accordance with the present disclosure.

FIG. 3 is a diagram illustrating an example 300 associated with spatial division multiplexing (SDM), in accordance with the present disclosure. As shown in FIG. 3, a mobile station (e.g., a UE) may communicate with a base station. For example, the mobile station may communicate with the base station via a first beam pair 305, a second beam pair 310, and/or a third beam pair 315. Each of the beam pairs includes a mobile station beam and a base station beam that are configured to transmit and/or receive communications on an associated beam path. Each of the associated beam paths may have spatial diversity from other associated beam paths based at least in part on having different angles at which the associated beam paths intersect the mobile station or the base station. The base station and the mobile station may communicate using the beam pairs simultaneously (e.g., overlapping in time) based at least in part on spatial division multiplexing. In other words, the mobile station may simultaneously transmit a first communication on a first beam path (e.g., using a first mobile station transmit beam), a second communication on a second beam path (e.g., using a second mobile station transmit beam), and/or a third communication on a third beam path (e.g., using a third mobile station transmit beam). The base station may receive the first communication, the second communication, and the third communication by processing signaling from the mobile station based at least in part on directions from which the base station receives portions of the signaling.

The mobile station and the base station may communicate using directional beams associated with frequency bands within FR2 and/or frequency bands within frequency ranges having higher frequencies than FR2. In some wireless networks, beams may be configured with widths that are based at least in part on frequencies used for communications. For example, a beam may be configured with a relatively narrow width based at least in part on the mobile station or the base station using the beam for communications on a relatively high frequency band.

The mobile station and/or the base station may be configured to communicate via a single beam per antenna group or may be configured to communicate via multiple beams per antenna group. For example, the mobile station and/or the base station may form multiple beams from a single antenna group using multiple phased arrays in the single antenna group, lenses, and/or Butler matrices. The mobile station and/or the base station may form multiple beams from a single antenna group based at least in part on communicating using frequency bands in frequency ranges above FR2 (e.g., sub-terahertz signals and/or millimeter wave signals, among other examples).

As indicated above, FIG. 3 is provided as an example. Other examples may differ from what is described with regard to FIG. 3.

Figure 4:
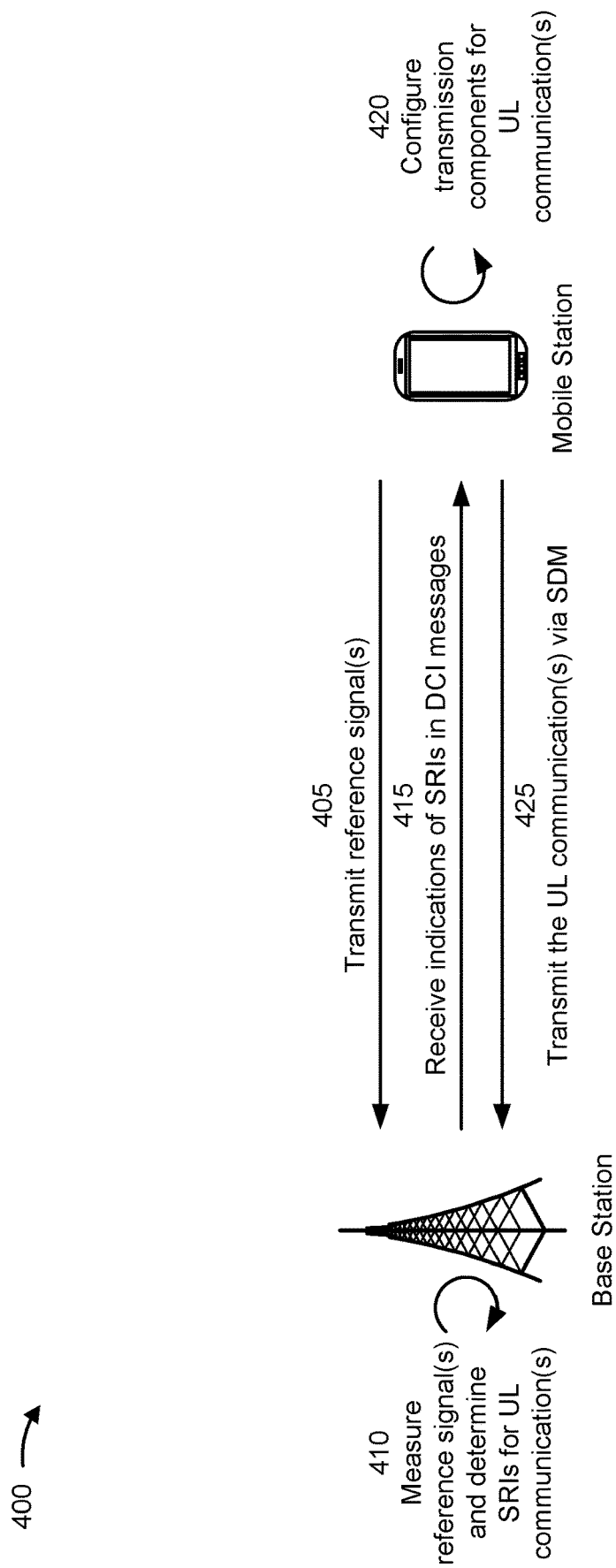

FIG. 4 is a diagram illustrating an example 400 associated with SDM, in accordance with the present disclosure. As shown in FIG. 4, a mobile station (e.g., a UE) may communicate with a base station. The mobile station may be configured to communicate with the base station using SDM.

As shown by reference number 405, the mobile station may transmit, and the base station may receive, one or more reference signals (e.g., SRSs). For example, the mobile station may transmit the one or more reference signals using multiple beams associated with multiple SRIs.

As shown by reference number 410, the base station may measure the one or more reference signals and determine SRIs for one or more uplink communications. For example, the base station may select, based at least in part on measurements of multiple reference signals of the one or more reference signals, multiple beams that may be used for SDM communications between the mobile station and the base station. The base station may identify the multiple beams based at least in part on SRIs associated with the multiple reference signals.

As shown by reference number 415, the mobile station may receive, and the base station may transmit, indications of SRIs in downlink control information (DCI) messages. For example, the mobile station may receive a first DCI message that indicates a first SRI, a second DCI message that indicates a second SRI, and/or a third DCI message that indicates a third SRI, among other examples.

As shown by reference number 420, the mobile station may configure transmission components for one or more uplink communications. For example, the mobile station may configure one or more antenna groups, transmission chains, and/or baseband components, among other examples, to transmit the one or more uplink communications via multiple mobile station beams as indicated in the DCI messages.

As shown by reference number 425, the mobile station may transmit, and the base station may receive, the one or more uplink communications via SDM. In some examples, the mobile station may transmit a single uplink communication via multiple beams using SDM. In some examples, the mobile station may transmit different uplink communications via different beams using SDM.

The base station and the mobile station may consume power, computing, network, and/or communication resources to receive multiple DCI messages to schedule uplink communications via different beams (e.g., based at least in part on indicating multiple SRIs).

As indicated above, FIG. 4 is provided as an example. Other examples may differ from what is described with regard to FIG. 4.

In some aspects described herein, a base station may configure one or more SRI groups that each include one or more SRIs. The base station may determine one or more SRIs to include in an SRI group based at least in part on measurements of reference signals (e.g., SRSs), associated with the one or more SRIs, received from a mobile station. The base station may transmit (e.g., using RRC signaling or MAC signaling), to the mobile station, an indication of configurations of a set of SRI groups. After the base station has indicated configurations of the set of resource groups, the base station may transmit a DCI message to indicate an SRI group, of the set of SRI groups, for the mobile station to use for transmitting one or more uplink communications via multiple beams associated with the one or more SRIs included in the SRI group. In some aspects, the mobile station may transmit the one or more uplink communications, via the multiple beams, using an SDM configuration.

In this way, the base station and the mobile station may conserve power, computing, network, and/or communication resources that may have otherwise been consumed by receiving multiple DCI messages to schedule uplink communications via the multiple beams.

Figure 5:
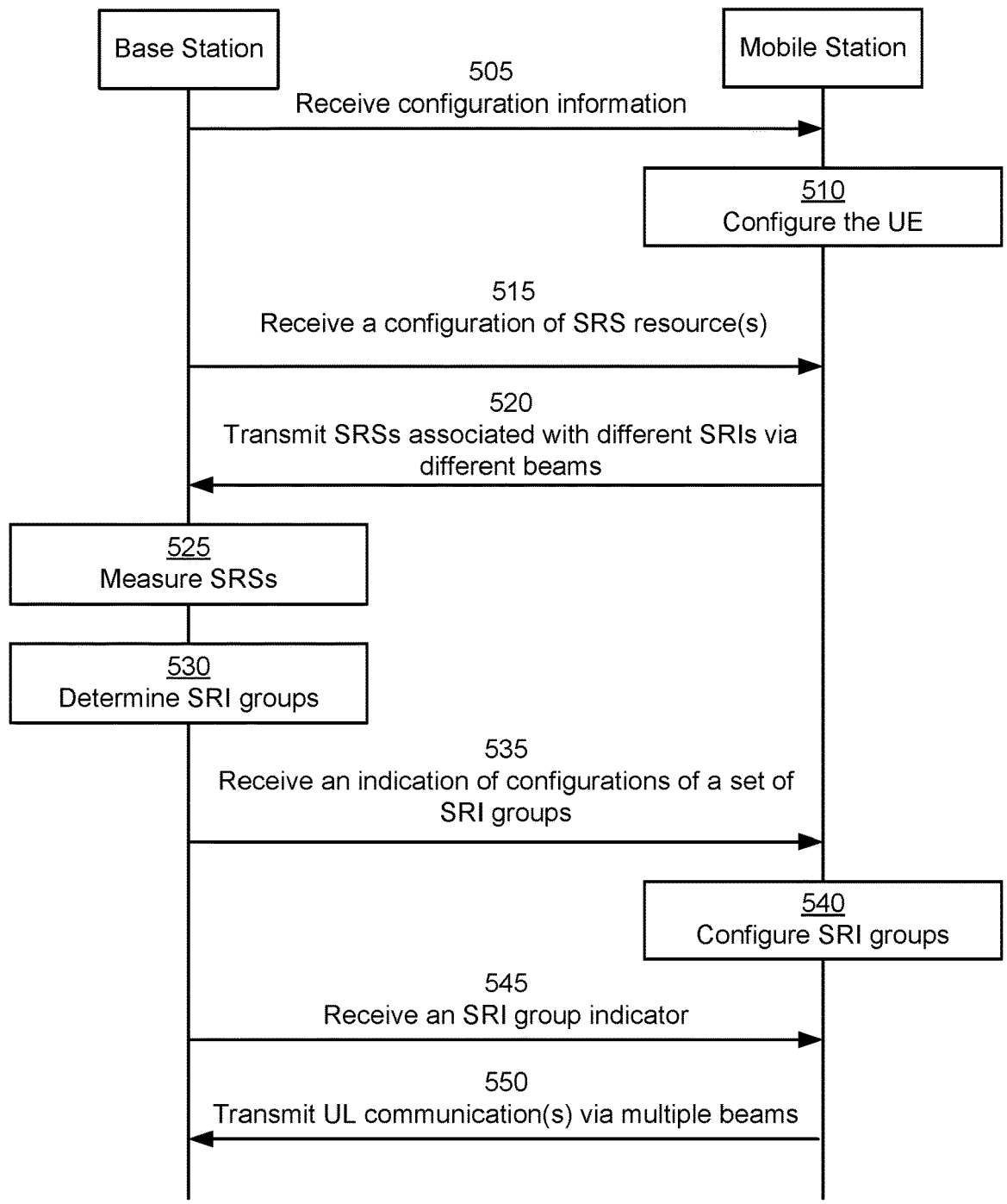
FIG. 5 is a diagram illustrating an example associated with sounding reference signal resource indicator group indication, in accordance with the present disclosure.

FIG. 5 is a diagram illustrating an example 500 associated with sounding reference signal resource indicator group indication, in accordance with the present disclosure. As shown in FIG. 5, a mobile station (e.g., UE 120) may communicate with a base station (e.g., base station 110). The mobile station and the base station may be part of a wireless network (e.g., wireless network 100). The mobile station and the base station may communicate using a frequency band that is within FR2 or a higher frequency range. In some aspects, the mobile station and the base station may communicate using beamforming. In some aspects, the mobile station and the base station may be configured to communicate using SDM. In some aspects, the mobile station may perform a cell search to find a cell provided by the base station. The mobile station may connect to the base station based at least in part on a random access channel process, among other examples.

As shown by reference number 505, the mobile station may receive configuration information (e.g., from the base station, another base station, and/or the like) and/or may determine the configuration information based at least in part on a communication protocol. In some aspects, the mobile station may receive the configuration information via one or more of RRC signaling, MAC control elements (MAC CEs), DCI, and/or the like. In some aspects, the configuration information may include an indication of one or more configuration parameters (e.g., already known to the mobile station) for selection by the mobile station, and/or explicit configuration information for the mobile station to use to configure the mobile station, among other examples.

In some aspects, the configuration information may indicate that the mobile station is to be configured to communicate using SDM when multiple SRIs are indicated by the base station. In some aspects, the configuration information may indicate that the mobile station is to receive an indication of configurations of sets of SRI groups and that the mobile station is to store the configurations for selection by the base station. In some aspects, the configuration information may indicate that the mobile station is to configure components of the mobile station for communicating via multiple beams based at least in part on reception of an SRI group indicator that indicates selection of an SRI group of a set of SRI groups.

As shown by reference number 510, the mobile station may configure the mobile station for communicating with the base station. In some aspects, the mobile station may configure the mobile station based at least in part on the configuration information. In some aspects, the mobile station may be configured to perform one or more operations described herein. In some aspects, the mobile station may transmit a capabilities report to the base station. For example, the capabilities report may indicate whether the mobile station may communicate using SDM, a maximum number of beams that the mobile station can use for SDM, and/or whether the mobile station can communicate via multiple beams of a single antenna group, among other examples.

As shown by reference number 515, the mobile station may receive, and the base station may transmit, an indication of a configuration of one or more SRS resources. In some aspects, the base station may indicate a configuration of a first SRS resource for the mobile station to use to transmit one or more SRSs via a first beam, a configuration of a second SRS resource for the mobile station to use to transmit one or more SRSs via a second beam, and/or a configuration of a third SRS resource for the mobile station to use to transmit one or more SRSs via a third beam, among other examples. In some aspects, the base station may indicate a configuration of five or more SRS resources, 10 or more SRS resources, and/or the like.

As shown by reference number 520, the mobile station may transmit SRSs associated with different SRIs via different beams. For example, the mobile station may transmit multiple SRSs via multiple beams. In some aspects, each SRI may be associated with a respective SRS resource and/or mobile station transmit beam.

As shown by reference number 525, the base station may measure the SRSs. In some aspects, the base station may determine one or more parameters associated with the SRSs, such as RSRP, RSSI, RSRQ, and CQI, among other examples. In this way, the base station may determine whether a beam path provides a small enough pathloss to communicate with the mobile station.

As shown by reference number 530, the base station may determine SRI groups. For example, the base station may determine a set of SRI groups based at least in part on measurements of the SRSs. In some aspects, the base station may determine which SRSs may be grouped for SDM uplink communications based at least in part on interference between the SRSs. For example, the base station may measure signal-to-interference-plus-noise ratios (SINRs) for the SRSs to determine interference between the SRSs.

In some aspects, each SRI group, of the set of SRI groups, may have a same number of SRIs. In some aspects, SRI groups may have different numbers of SRIs. In some aspects, the base station may attempt to maximize a number of SRIs within an SRI group that satisfy an interference parameter (e.g., an interference threshold). In some implementations, an SRI may be included in multiple SRI groups. For example, if a first SRS has a relatively high RSRP and is measured to not cause substantial interference with other SRSs, a first SRI associated with the first SRS may be included in multiple (e.g., all) SRI groups. If a second SRS has a relatively high RSRP and is measured to cause substantial interference with all but the first SRS, an SRI group may include only the first SRI and an SRI associated with the second SRS. In some aspects, SRI groups may have a threshold number of SRIs (e.g., a minimum number of SRIs). For example, if a threshold number of SRIs is 3, the second SRI may be excluded from the set of SRI groups because it cannot be grouped with at least 2 other SRIs.

As shown by reference number 535, the mobile station may receive, and the base station may transmit, an indication of configurations of the set of SRI groups. In some aspects, the mobile station may receive the indication of configurations of the set of SRI groups via RRC signaling and/or MAC signaling (e.g., one or more MAC CEs).

As shown by reference number 540, the mobile station may configure SRI groups of the set of SRI groups. In some aspects, the mobile station may store SRI groups associated with SRI group indicators for selection by the base station.

As shown by reference number 545, the mobile station may receive, and the base station may transmit, an SRI group indicator. In some aspects, the SRI group indicator may indicate multiple SRIs for one or more uplink communications. In some aspects, the mobile station may receive the SRI group indicator within a resource scheduling message (e.g., a DCI message or a configured grant, among other examples).

In some aspects, the SRI group indicator may indicate the SRI group based at least in part on satisfaction of an interference threshold among the multiple SRIs. For example, the base station may determine that interference among the multiple SRIs satisfies a threshold (e.g., is at or below the threshold) based at least in part on measurements of the SRSs. In some aspects, the SRI group indicator may indicate the SRI group based at least in part on the SRI group having a largest number of SRIs that satisfy the interference threshold. In some aspects, the SRI group indicator may indicate the SRI group based at least in part on the SRI group having a lowest interference among SRIs of the SRI groups (e.g., for SRI groups with a same number of SRIs). In some aspects, the SRI group indicator may indicate the SRI group based at least in part on the SRI group having a lowest interference among SRIs of the SRI groups that satisfy an SRI number threshold (e.g., that have a minimum number of SRIs).

As shown by reference number 550, the mobile station may transmit the one or more communications via multiple beams associated with the SRIs of the SRI group indicator. For example, the mobile station may configure one or more components of the mobile station (e.g., antenna groups, transmission chains, and/or baseband components, among other examples) to transmit the one or more communications via the multiple beams using SDM. In some aspects, the mobile station may transmit multiple streams via the multiple beams. In some aspects, the mobile station may transmit a single stream via the multiple beams.

Based at least in part on the base station configuring the mobile station with a set of SRI groups, the base station may indicate multiple SRIs using a single DCI and/or using a number of bits that is less than individual indications of the multiple SRIs. In this way, the base station and the mobile station may conserve power, computing, network, and/or communication resources to that may have otherwise been consumed by receiving multiple DCI messages to schedule uplink communication via the multiple beams.

As indicated above, FIG. 5 is provided as an example. Other examples may differ from what is described with regard to FIG. 5.

Figure 6:
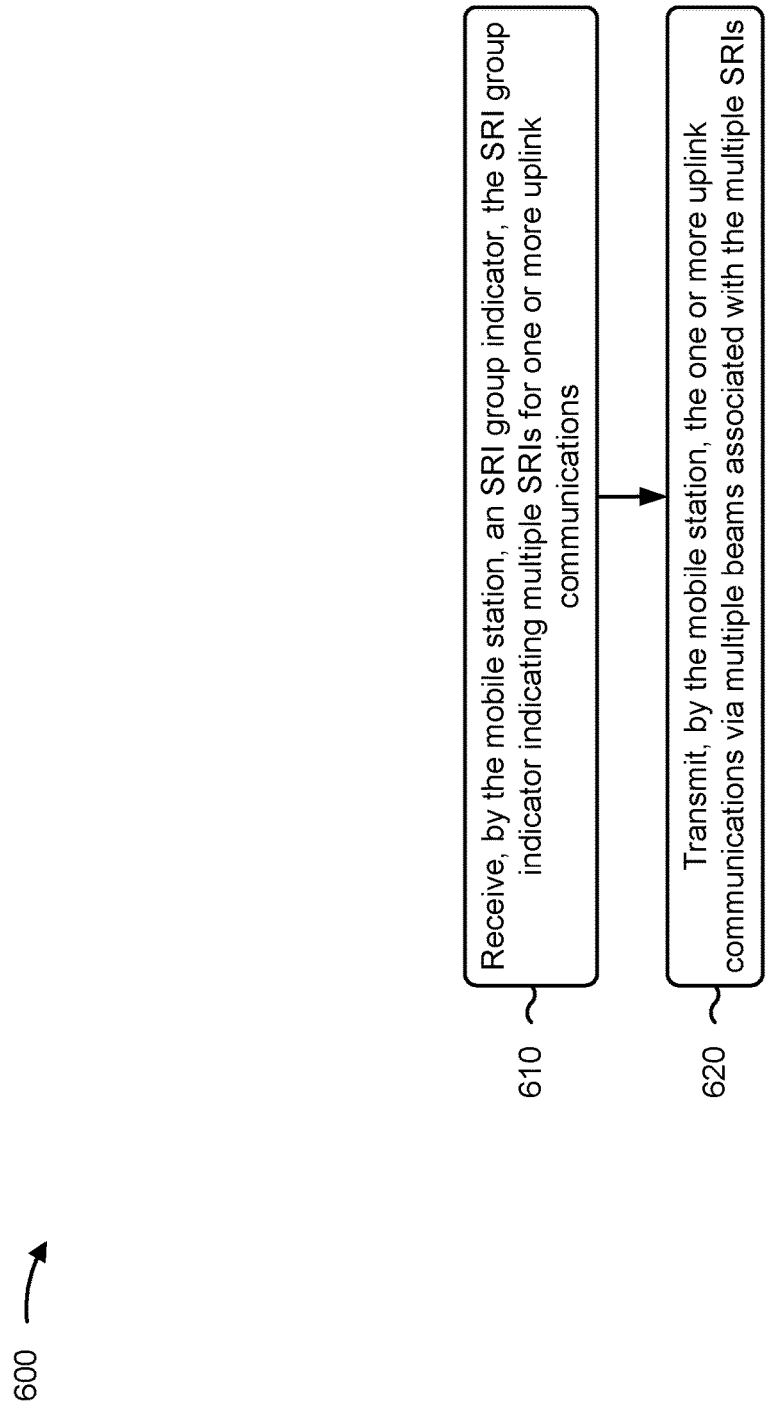
FIGS. 6 and 7 are diagrams illustrating example processes associated with sounding reference signal resource indicator group indication, in accordance with the present disclosure.

FIG. 6 is a diagram illustrating an example process 600 performed, for example, by a mobile station, in accordance with the present disclosure. Example process 600 is an example where the mobile station (e.g., mobile station 120) performs operations associated with SRI group indication.

As shown in FIG. 6, in some aspects, process 600 may include receiving an SRI group indicator, the SRI group indicator indicating multiple SRIs for one or more uplink communications (block 610). For example, the mobile station (e.g., using reception component 802, depicted in FIG. 8) may receive an SRI group indicator, the SRI group indicator indicating multiple SRIs for one or more uplink communications, as described above.

As further shown in FIG. 6, in some aspects, process 600 may include transmitting the one or more uplink communications via multiple beams associated with the multiple SRIs (block 620). For example, the mobile station (e.g., using transmission component 804, depicted in FIG. 8) may transmit the one or more uplink communications via multiple beams associated with the multiple SRIs, as described above.

Process 600 may include additional aspects, such as any single aspect or any combination of aspects described below and/or in connection with one or more other processes described elsewhere herein.

In a first aspect, process 600 includes receiving an indication of configurations of a set of SRI groups, wherein each SRI group, of the set of SRI groups, indicates multiple SRIs for uplink communications.

In a second aspect, alone or in combination with the first aspect, receiving the indication of the configurations of the set of SRI groups comprises receiving the indication of the configurations of the set of SRI groups via one or more of RRC signaling or MAC signaling.

In a third aspect, alone or in combination with one or more of the first and second aspects, each SRI group, of the set of SRI groups, comprises a same number of SRIs.

In a fourth aspect, alone or in combination with one or more of the first through third aspects, SRI groups, of the set of SRI groups, comprise different numbers of SRIs.

In a fifth aspect, alone or in combination with one or more of the first through fourth aspects, receiving the SRI group indicator comprises receiving the SRI group indicator based at least in part on one or more of satisfaction of an interference threshold among the multiple SRIs; an SRI group indicated by the SRI group indicator having a largest number of SRIs, of SRI groups of the set of SRI groups, that satisfy an interference threshold; the multiple SRIs having a lowest interference among SRIs of the SRI groups; or the multiple SRIs having a lowest interference among SRIs of SRI groups that satisfy an SRI number threshold.

In a sixth aspect, alone or in combination with one or more of the first through fifth aspects, process 600 includes transmitting multiple SRSs via multiple beams, wherein the multiple SRIs are comprised in an SRI group indicated by the SRI group indicator based at least in part on measurements of the multiple SRSs.

In a seventh aspect, alone or in combination with one or more of the first through sixth aspects, receiving the SRI group indicator comprises receiving the SRI group indicator via downlink control information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
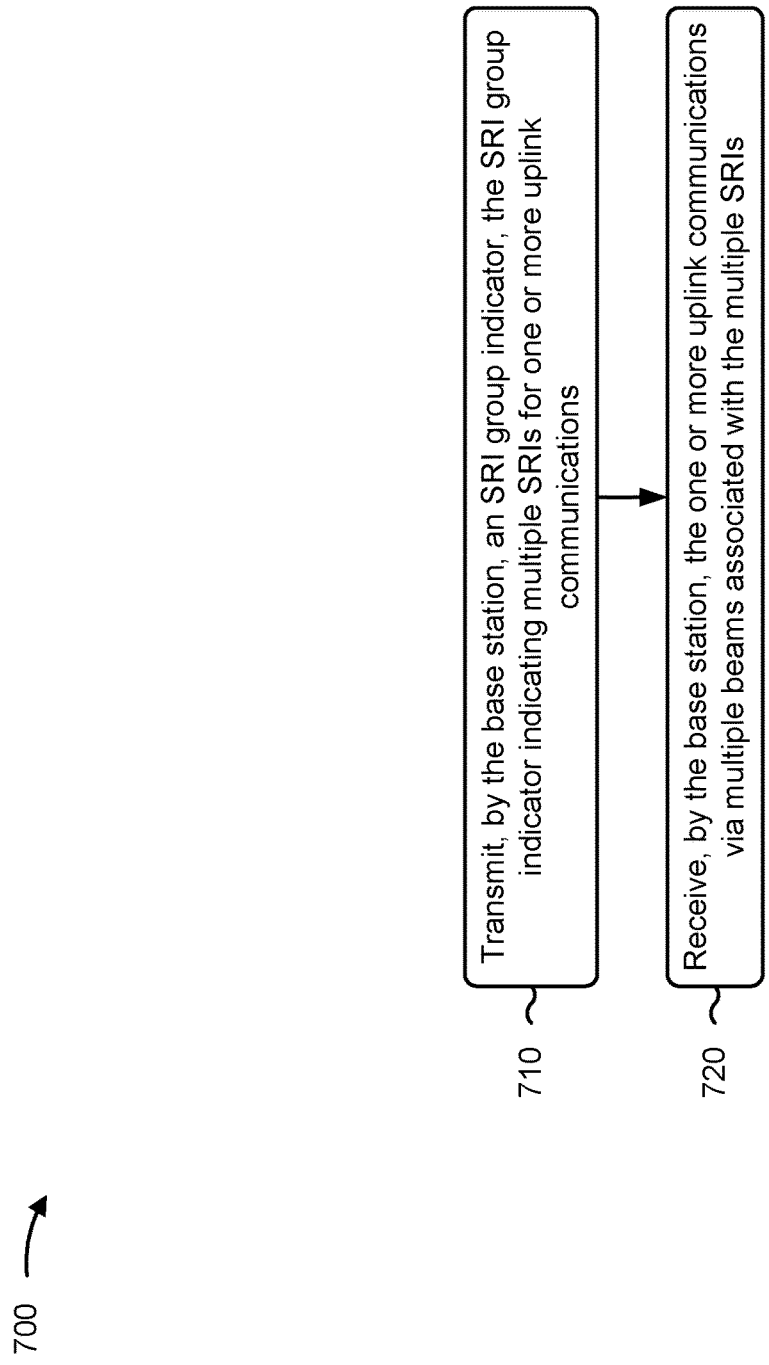

FIG. 7 is a diagram illustrating an example process 700 performed, for example, by a base station, in accordance with the present disclosure. Example process 700 is an example where the base station (e.g., base station 110) performs operations associated with SRI group indication.

As shown in FIG. 7, in some aspects, process 700 may include transmitting an SRI group indicator, the SRI group indicator indicating multiple SRIs for one or more uplink communications (block 710). For example, the base station (e.g., using transmission component 904, depicted in FIG. 9) may transmit an SRI group indicator, the SRI group indicator indicating multiple SRIs for one or more uplink communications, as described above.

As further shown in FIG. 7, in some aspects, process 700 may include receiving the one or more uplink communications via multiple beams associated with the multiple SRIs (block 720). For example, the base station (e.g., using reception component 902, depicted in FIG. 9) may receive the one or more uplink communications via multiple beams associated with the multiple SRIs, as described above.

Process 700 may include additional aspects, such as any single aspect or any combination of aspects described below and/or in connection with one or more other processes described elsewhere herein.

In a first aspect, process 700 includes transmitting an indication of configurations of a set of SRI groups, wherein each SRI group, of the set of SRI groups, indicates multiple SRIs for uplink communications.

In a second aspect, alone or in combination with the first aspect, transmitting the indication of the configurations of the set of SRI groups comprises transmitting the indication of the configurations of the set of SRI groups via one or more of RRC signaling or MAC signaling.

In a third aspect, alone or in combination with one or more of the first and second aspects, each SRI group, of the set of SRI groups, comprises a same number of SRIs.

In a fourth aspect, alone or in combination with one or more of the first through third aspects, SRI groups, of the set of SRI groups, comprise different numbers of SRIs.

In a fifth aspect, alone or in combination with one or more of the first through fourth aspects, transmitting the SRI group indicator comprises transmitting the SRI group indicator based at least in part on one or more of satisfaction of an interference threshold among the multiple SRIs; an SRI group indicated by the SRI group indicator having a largest number of SRIs, of SRI groups of the set of SRI groups, that satisfy an interference threshold; the multiple SRIs having a lowest interference among SRIs of the SRI groups; or the multiple SRIs having a lowest interference among SRIs of SRI groups that satisfy an SRI number threshold.

In a sixth aspect, alone or in combination with one or more of the first through fifth aspects, process 700 includes measuring multiple SRSs transmitted via multiple beams, wherein the multiple SRIs are comprised in an SRI group indicated by the SRI group indicator based at least in part on measurements of the multiple SRSs.

In a seventh aspect, alone or in combination with one or more of the first through sixth aspects, transmitting the SRI group indicator comprises transmitting the SRI group indicator via downlink control information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
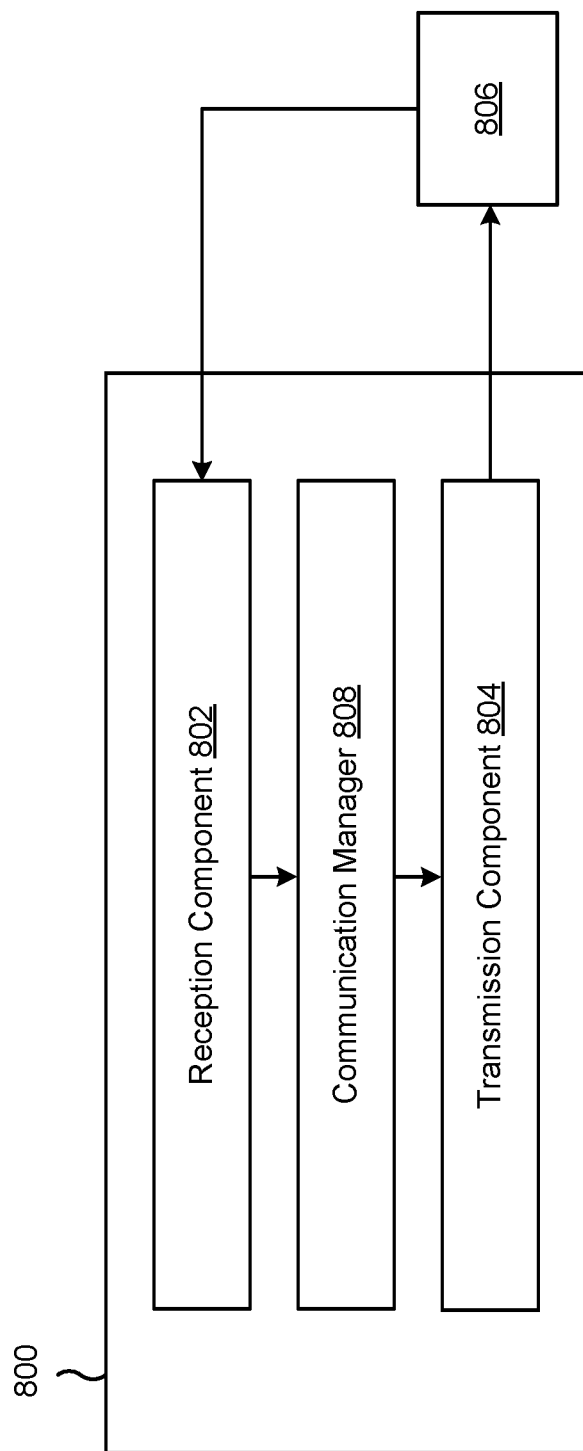
FIGS. 8 and 9 are block diagrams of example apparatuses for wireless communication, in accordance with the present disclosure.

FIG. 8 is a block diagram of an example apparatus 800 for wireless communication. The apparatus 800 may be a mobile station, or a mobile station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a mobile station, a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive an SRI group indicator, the SRI group indicator indicating multiple SRIs for one or more uplink communications. The transmission component 804 may transmit the one or more uplink communications via multiple beams associated with the multiple SRIs.

The reception component 802 may receive an indication of configurations of a set of SRI groups, wherein each SRI group, of the set of SRI groups, indicates multiple SRIs for uplink communications.

The transmission component 804 may transmit multiple SRSs via multiple beams, wherein the multiple SRIs are comprised in an SRI group indicated by the SRI group indicator based at least in part on measurements of the multiple SRSs.

The communication manager 808 may manage communications between the apparatus 800 and the apparatus 806. For example, the communication manager 808 may configure one or more components of the apparatus 800 to form a beam for communication with the apparatus 806. In some aspects, the communication manager 808 may perform one or more determinations, based at least in part on received and/or measured information, for communicating with the apparatus 806.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
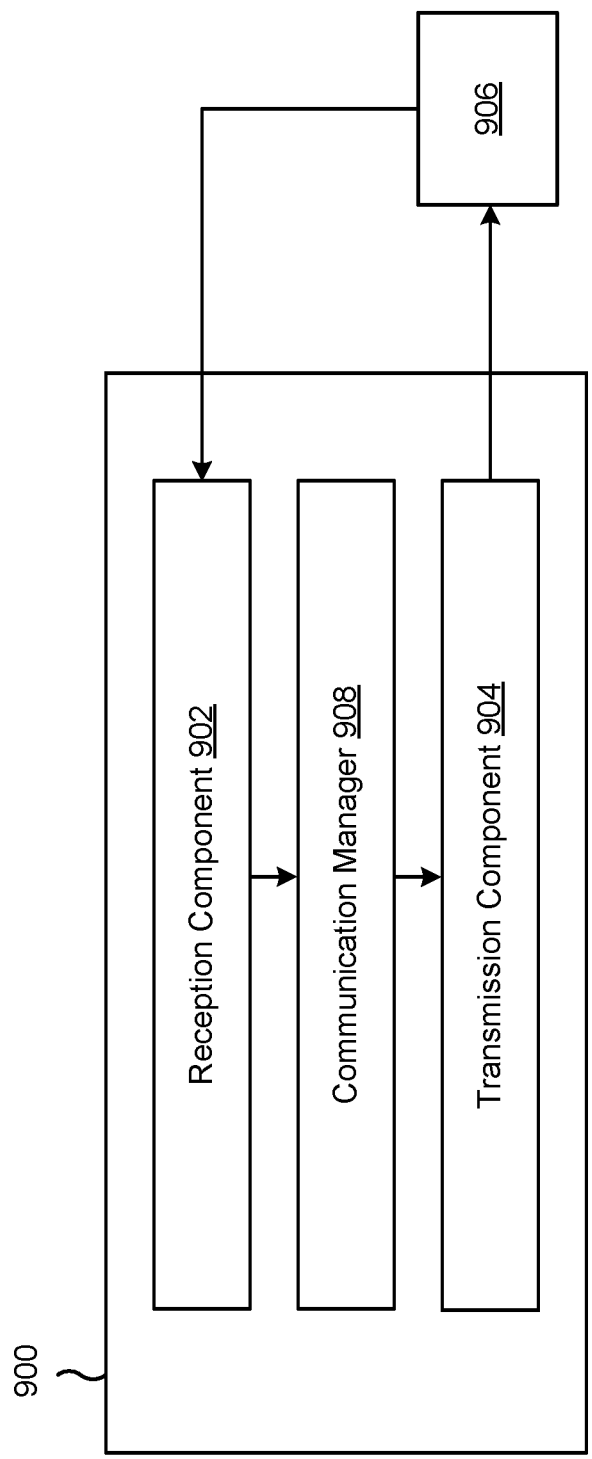

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a mobile station, a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIG. 5 Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit an SRI group indicator, the SRI group indicator indicating multiple SRIs for one or more uplink communications. The reception component 902 may receive the one or more uplink communications via multiple beams associated with the multiple SRIs.

The transmission component 904 may transmit an indication of configurations of a set of SRI groups, wherein each SRI group, of the set of SRI groups, indicates multiple SRIs for uplink communications.

The communication manager 908 and/or the reception component 902 may measure multiple SRSs transmitted via multiple beams, wherein the multiple SRIs are comprised in an SRI group indicated by the SRI group indicator based at least in part on measurements of the multiple SRSs.

The communication manager 908 may manage communications between the apparatus 900 and the apparatus 906. For example, the communication manager 808 may configure one or more components of the apparatus 900 to form a beam for communication with the apparatus 906. In some aspects, the communication manager 908 may perform one or more determinations, based at least in part on received and/or measured information, for communicating with the apparatus 906.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a mobile station, comprising: receiving, by the mobile station, a sounding reference signal (SRS) resource indicator (SRI) group indicator, the SRI group indicator indicating multiple SRIs for one or more uplink communications; and transmitting, by the mobile station, the one or more uplink communications via multiple beams associated with the multiple SRIs.

Aspect 2: The method of Aspect 1, further comprising: receiving an indication of configurations of a set of SRI groups, wherein each SRI group, of the set of SRI groups, indicates multiple SRIs for uplink communications.

Aspect 3: The method of Aspect 2, wherein receiving the indication of the configurations of the set of SRI groups comprises: receiving the indication of the configurations of the set of SRI groups via one or more of radio resource control signaling or medium access control signaling.

Aspect 4: The method of Aspect 3, wherein each SRI group, of the set of SRI groups, comprises a same number of SRIs.

Aspect 5: The method of Aspect 3, wherein SRI groups, of the set of SRI groups, comprise different numbers of SRIs.

Aspect 6: The method of any of Aspects 3-5, wherein receiving the SRI group indicator comprises: receiving the SRI group indicator based at least in part on one or more of: satisfaction of an interference threshold among the multiple SRIs, an SRI group indicated by the SRI group indicator having a largest number of SRIs, of SRI groups of the set of SRI groups, that satisfy an interference threshold, the multiple SRIs having a lowest interference among SRIs of the SRI groups, or the multiple SRIs having a lowest interference among SRIs of SRI groups that satisfy an SRI number threshold.

Aspect 7: The method of any of Aspects 1-6, further comprising: transmitting multiple SRSs via multiple beams, wherein the multiple SRIs are comprised in an SRI group indicated by the SRI group indicator based at least in part on measurements of the multiple SRSs.

Aspect 8: The method of any of Aspects 1-7, wherein receiving the SRI group indicator comprises: receiving the SRI group indicator via downlink control information.

Aspect 9: A method of wireless communication performed by a base station, comprising: transmitting, by the base station, a sounding reference signal (SRS) resource indicator (SRI) group indicator, the SRI group indicator indicating multiple SRIs for one or more uplink communications; and receiving, by the base station, the one or more uplink communications via multiple beams associated with the multiple SRIs.

Aspect 10: The method of Aspect 9, further comprising: transmitting an indication of configurations of a set of SRI groups, wherein each SRI group, of the set of SRI groups, indicates multiple SRIs for uplink communications.

Aspect 11: The method of Aspect 10, wherein transmitting the indication of the configurations of the set of SRI groups comprises: transmitting the indication of the configurations of the set of SRI groups via one or more of radio resource control signaling or medium access control signaling.

Aspect 12: The method of Aspect 11, wherein each SRI group, of the set of SRI groups, comprises a same number of SRIs.

Aspect 13: The method of Aspect 11, wherein SRI groups, of the set of SRI groups, comprise different numbers of SRIs.

Aspect 14: The method of any of Aspects 11-13, wherein transmitting the SRI group indicator comprises: transmitting the SRI group indicator based at least in part on one or more of: satisfaction of an interference threshold among the multiple SRIs, an SRI group indicated by the SRI group indicator having a largest number of SRIs, of SRI groups of the set of SRI groups, that satisfy an interference threshold, the multiple SRIs having a lowest interference among SRIs of the SRI groups, or the multiple SRIs having a lowest interference among SRIs of SRI groups that satisfy an SRI number threshold.

Aspect 15: The method of any of Aspects 9-14, further comprising: measuring multiple SRSs transmitted via multiple beams, wherein the multiple SRIs are comprised in an SRI group indicated by the SRI group indicator based at least in part on measurements of the multiple SRSs.

Aspect 16: The method of any of Aspects 9-15, wherein transmitting the SRI group indicator comprises: transmitting the SRI group indicator via downlink control information.

Aspect 17: An apparatus for wireless communication at a device, comprising a processor; memory coupled with the processor; and instructions stored in the memory and executable by the processor to cause the apparatus to perform the method of one or more Aspects of Aspects 1-16.

Aspect 18: A device for wireless communication, comprising a memory and one or more processors coupled to the memory, the memory and the one or more processors configured to perform the method of one or more Aspects of Aspects 1-16.

Aspect 19: An apparatus for wireless communication, comprising at least one means for performing the method of one or more Aspects of Aspects 1-16.

Aspect 20: A non-transitory computer-readable medium storing code for wireless communication, the code comprising instructions executable by a processor to perform the method of one or more Aspects of Aspects 1-16.

Aspect 21: A non-transitory computer-readable medium storing a set of instructions for wireless communication, the set of instructions comprising one or more instructions that, when executed by one or more processors of a device, cause the device to perform the method of one or more Aspects of Aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
    a memory; and
    one or more processors coupled to the memory and based at least in part on information stored in the memory configured to:
        receive a sounding reference signal (SRS) resource indicator (SRI) group indicator of a set of SRI group indicators,
            the SRI group indicator indicating multiple SRIs for one or more uplink communications,
                an SRI, of the multiple SRIs indicated by the SRI group indicator, being included in a group of SRIs indicated by another SRI group indicator, of the set of SRI group indicators; and
        transmit the one or more uplink communications via multiple beams associated with the multiple SRIs.

2. The mobile station of claim 1, wherein the one or more processors are further configured to:
    receive an indication of configurations of a set of SRI groups,
        wherein each SRI group, of the set of SRI groups, indicates multiple SRIs for uplink communications.

3. The mobile station of claim 2, wherein the one or more processors, when receiving the indication of the configurations of the set of SRI groups, are configured to:

receive the indication of the configurations of the set of SRI groups via one or more of radio resource control signaling or medium access control signaling.

4. The mobile station of claim 3, wherein each SRI group, of the set of SRI groups, comprises a same number of SRIs.

5. The mobile station of claim 3, wherein SRI groups, of the set of SRI groups, comprise different numbers of SRIs.

6. The mobile station of claim 3, wherein the one or more processors, when receiving the SRI group indicator, are configured to:
receive the SRI group indicator based at least in part on one or more of:
satisfaction of an interference threshold among the multiple SRIs,
an SRI group indicated by the SRI group indicator having a largest number of SRIs, of SRI groups of the set of SRI groups, that satisfy an interference threshold,
the multiple SRIs having a lowest interference among SRIs of the SRI groups, or
the multiple SRIs having a lowest interference among SRIs of SRI groups that satisfy an SRI number threshold.

7. The mobile station of claim 1, wherein the one or more processors are further configured to:
transmit multiple SRSs via multiple beams,
wherein the multiple SRIs are comprised in an SRI group indicated by the SRI group indicator based at least in part on measurements of the multiple SRSs.

8. The mobile station of claim 1, wherein the one or more processors, when receiving the SRI group indicator, are configured to:
receive the SRI group indicator via downlink control information.

9. A method of wireless communication performed by a mobile station, comprising:
receiving, by the mobile station, a sounding reference signal (SRS) resource indicator (SRI) group indicator of a set of SRI group indicators,
the SRI group indicator indicating multiple SRIs for one or more uplink communications,
an SRI, of the multiple SRIs indicated by the SRI group indicator, being included in a group of SRIs indicated by another SRI group indicator, of the set of SRI group indicators; and
transmitting, by the mobile station, the one or more uplink communications via multiple beams associated with the multiple SRIs.

10. The method of claim 9, further comprising:
receiving an indication of configurations of a set of SRI groups,
wherein each SRI group, of the set of SRI groups, indicates multiple SRIs for uplink communications.

11. The method of claim 10, wherein receiving the indication of the configurations of the set of SRI groups comprises:
receiving the indication of the configurations of the set of SRI groups via one or more of radio resource control signaling or medium access control signaling.

12. The method of claim 11, wherein each SRI group, of the set of SRI groups, comprises a same number of SRIs.

13. The method of claim 11, wherein SRI groups, of the set of SRI groups, comprise different numbers of SRIs.

14. The method of claim 11, wherein receiving the SRI group indicator comprises:
receiving the SRI group indicator based at least in part on one or more of:
satisfaction of an interference threshold among the multiple SRIs,
an SRI group indicated by the SRI group indicator having a largest number of SRIs, of SRI groups of the set of SRI groups, that satisfy an interference threshold,
the multiple SRIs having a lowest interference among SRIs of the SRI groups, or
the multiple SRIs having a lowest interference among SRIs of SRI groups that satisfy an SRI number threshold.

15. The method of claim 9, further comprising:
transmitting multiple SRSs via multiple beams,
wherein the multiple SRIs are comprised in an SRI group indicated by the SRI group indicator based at least in part on measurements of the multiple SRSs.

16. The method of claim 9, wherein receiving the SRI group indicator comprises:
receiving the SRI group indicator via downlink control information.

17. A non-transitory computer-readable medium storing a set of instructions for wireless communication, the set of instructions comprising:
one or more instructions that, when executed by one or more processors of a mobile station, cause the mobile station to:
receive a sounding reference signal (SRS) resource indicator (SRI) group indicator of a set of SRI group indicators,
the SRI group indicator indicating multiple SRIs for one or more uplink communications,
an SRI, of the multiple SRIs indicated by the SRI group indicator, being included in a group of SRIs indicated by another SRI group indicator, of the set of SRI group indicators; and
transmit the one or more uplink communications via multiple beams associated with the multiple SRIs.

18. The non-transitory computer-readable medium of claim 17, wherein the one or more instructions further cause the mobile station to:
receive an indication of configurations of a set of SRI groups,
wherein each SRI group, of the set of SRI groups, indicates multiple SRIs for uplink communications.

19. The non-transitory computer-readable medium of claim 18, wherein the one or more instructions, that cause the mobile station to receive the indication of the configurations of the set of SRI groups, cause the mobile station to:
receive the indication of the configurations of the set of SRI groups via one or more of radio resource control signaling or medium access control signaling.

20. The non-transitory computer-readable medium of claim 19, wherein each SRI group, of the set of SRI groups, comprises a same number of SRIs.

21. The non-transitory computer-readable medium of claim 19, wherein SRI groups, of the set of SRI groups, comprise different numbers of SRIs.

22. The non-transitory computer-readable medium of claim 17, wherein the one or more instructions further cause the mobile station to:
transmit multiple SRSs via multiple beams,
wherein the multiple SRIs are comprised in an SRI group indicated by the SRI group indicator based at least in part on measurements of the multiple SRSs.

23. The non-transitory computer-readable medium of claim 17, wherein the one or more instructions, that cause the mobile station to receive the SRI group indicator, cause the mobile station to:
  receive the SRI group indicator via downlink control information.

24. An apparatus for wireless communication, comprising:
  means for receiving a sounding reference signal (SRS) resource indicator (SRI) group indicator of a set of SRI group indicators,
    the SRI group indicator indicating multiple SRIs for one or more uplink communications,
      an SRI, of the multiple SRIs indicated by the SRI group indicator, being included in a group of SRIs indicated by another SRI group indicator, of the set of SRI group indicators; and
  means for transmitting the one or more uplink communications via multiple beams associated with the multiple SRIs.

25. The apparatus of claim 24, further comprising:
  means for receiving an indication of configurations of a set of SRI groups,
    wherein each SRI group, of the set of SRI groups, indicates multiple SRIs for uplink communications.

26. The apparatus of claim 25, wherein the means for receiving the indication of the configurations of the set of SRI groups comprises:
  means for receiving the indication of the configurations of the set of SRI groups via one or more of radio resource control signaling or medium access control signaling.

27. The apparatus of claim 26, wherein each SRI group, of the set of SRI groups, comprises a same number of SRIs.

28. The apparatus of claim 26, wherein SRI groups, of the set of SRI groups, comprise different numbers of SRIs.

29. The apparatus of claim 24, further comprising:
  means for transmitting multiple SRSs via multiple beams,
    wherein the multiple SRIs are comprised in an SRI group indicated by the SRI group indicator based at least in part on measurements of the multiple SRSs.

30. The apparatus of claim 24, wherein the means for receiving the SRI group indicator comprises:
  means for receiving the SRI group indicator via downlink control information.

\* \* \* \* \*